April 21, 1953     G. C. REID ET AL     2,635,868
LOAD WEIGHING DEVICE FOR HYDRAULIC LOADERS
Filed Sept. 29, 1950     2 SHEETS—SHEET 1
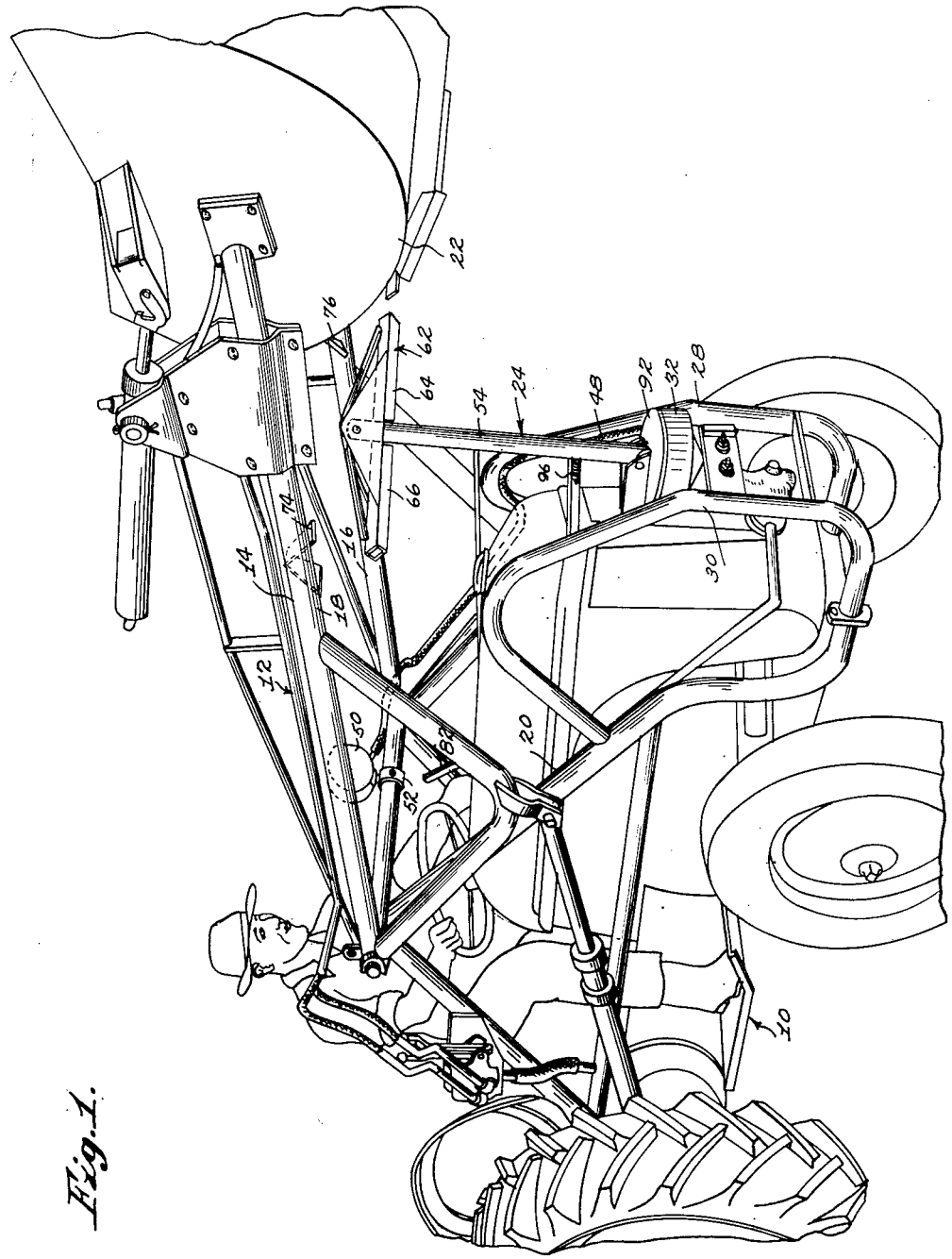
INVENTORS
GEORGE C. REID
ROBERT B. CHAMBERS
BY
McMorrow, Berman & Davidson
ATTORNEYS

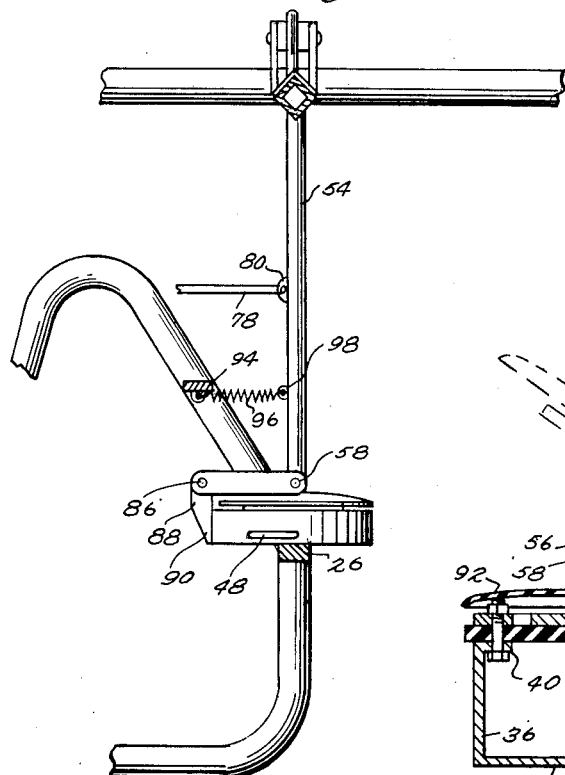
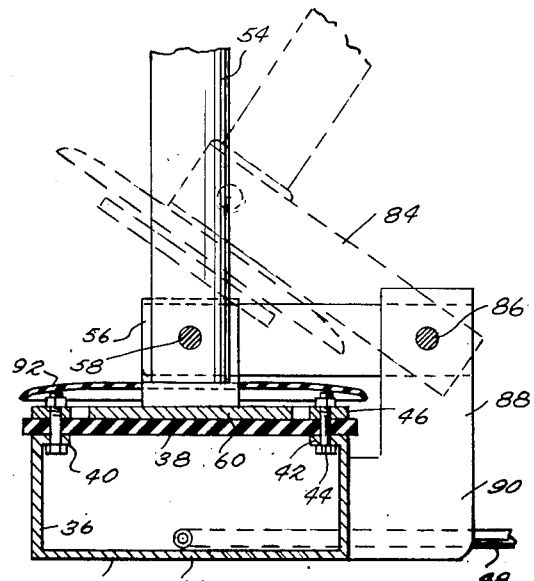
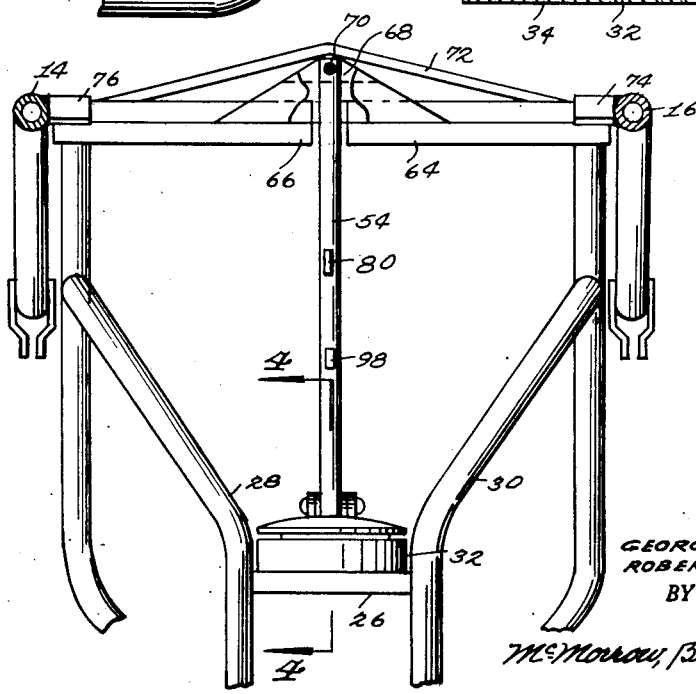

UNITED STATES PATENT OFFICE 2,635,868

LOAD WEIGHING DEVICE FOR HYDRAULIC LOADERS

George C. Reid and Robert B. Chambers, Lander, Wyo.

Application September 29, 1950, Serial No. 187,634

9 Claims. (Cl. 265—47)

This invention appertains to improvements in loading devices and more particularly to means for indicating the quantity of material held in the loading device.

A primary object of this invention is to provide a weighing device for a loader, the weighing device transmitting the weight of the load held in the loader through hydraulic means to an indicator, which indicates the quantity of material in the loader.

Another important object of this invention is to provide a weighing device for a hydraulically operated loader, which is mounted on a tractor or other powered vehicle, the weighing device being operatively installed on the forward end of the tractor and supporting the arms of the boom portion of the loader, thereby supporting the loader and the load held therein and the weighing device displacing a quantity of fluid, proportionate to the weight of the boom and the load held in the bucket at the outer end of the boom, the displaced portion of fluid operating an indicator to register the weight of the load.

These and ancillary objects and structural features of merit are attained by this invention, the preferred embodiment of which is set forth in the following description and illustrated in the accompanying drawings, wherein:

Figure 1 is a perspective view of a conventional hydraulically actuated loader, which is mounted on a tractor and which is provided with a weighing device, constructed in accordance with the principles of this invention;

Figure 2 is an enlarged elevational view of the weighing device;

Figure 3 is an enlarged rear elevational view thereof, and

Figure 4 is a longitudinal vertical sectional view taken on line 4—4 of Figure 3.

In the accompanying drawings, a conventional tractor 10 is illustrated, the same supporting a hydraulically actuated loader 12, which consists of a pivotally supported boom 14 having arms 16 and 18, which are pivoted at their inner ends to a frame 20 mounted on the tractor frame. A bucket 22 is carried by the outer ends of the boom arms and is hydraulically actuated to scoop up a quantity of material. In use, the boom is lowered to dispose the bucket in contact with the material and the bucket is actuated to scoop up a portion of the material, the boom then being raised and the tractor being driven to a depositing locale, where the material in the bucket is deposited by either swinging the bucket to a dumping position or opening a discharge door in the bucket.

It is highly desirable, especially, in loading concrete mixers, to accurately determine the amount of material, since proportions are critical. In such instances, it is conventionally necessary to weigh the material, prior to loading of the mixtures by the operation of the scoop or bucket 22 or else, to weigh the materials after they are discharged from the bucket.

To obviate the defects, attendant with the foregoing systems, and to reduce the time and labor attendant therewith, a weighing device 24 is provided, the weighing device being supported by the tractor and being adapted to support the boom and loaded bucket and to register by hydraulic means the weight thereof. Thus, the load may be weighed, while it is being transferred by the bucket to the mixer or other suitable discharging locale, depending upon the type of material and the specific use to which the loader is put.

The loading device 24 includes a mounting plate 26, which is transversely fixed between the arms 28 and 30 of the frame 20. A cylindrical housing 32 is mounted on the supporting bar 26 and includes a bottom wall 34 and an upstanding side wall 36. The housing is open at the top and a resilient closure member 38 is secured on the upper edges of the side wall, the closure member being transversely disposed and closing off the open upper end of the housing. In this respect, an annular inwardly directed lateral flange 40 is formed on the upper edge of the annular side wall of the housing and the flange is provided with vertical openings 42 for the reception of fasteners 44, the fasteners passing through suitable openings formed in the resilient member 38 and through openings formed in a retaining ring 46. Thus, the resilient member 38 is detachably clamped between the flange 42 and the ring 46, the member being centrally depressible interiorly of the housing to deplace a portion of the fluid, such as oil, which normally completely fills the housing. The displaced fluid is conveyed by a flexible conduit 48 to an indicator 50, which is attached by a clamp 52 to the frame 20, in front of the operator's zone.

Means is provided for transmitting the weight of the load to the resilient member 38 and depressing the resilient member in accordance with the weight. The means includes a post 54, which vertically overlies the housing and which is anchored at its lower end in a collar 56 by means of a locking pin 58, the collar having an enlarged flange 60 formed laterally on its lower end, the flange 60 being engageable in superimposed relation on the resilient member 38.

A load equalizing member 62 is mounted on the upper end of the post 54 and includes a pair of tubular members 64 and 66 which are spaced apart at their inner confronting ends, the ends being joined in fixed relation by being welded to upstanding triangular plates 68. The upper end of the post 54 extends between the inner ends of the tubular members 64 and 66 and is pivoted by a pivot element 70 between the apices of the plates 68. The tubular members are braced by a brace bar 72, which is connected to the outer ends thereof and extends over the upper end of the post 54.

Saddle plates 74 and 76 are carried by the arms 14 and 16 of the boom and are engageable on the outer ends of the tubular members 64 and 66, to transmit the weight of the boom and the load in the bucket 22 to the resilient member 38, which is depressed inwardly of the housing, reactive to the imposition thereon of the load, and which displaces a proportionate quantity of the fluid in the housing through the tubular conduit 48 to the indicator 50, which indicates the quantity of material in the scoop or bucket 22.

An actuating rod 78 is fixed to an ear 80 which projects rearwardly from the post 54 and is connected to a handle 82, adjacent to the operator's zone on the tractor, whereby the post may be moved forwardly and rearwardly, respecting the housing. In this respect, an arm 84 projects laterally from the collar 56 and is pivoted by a pivot member 86 to an upstanding ear 88 formed on a plate 90, which is suitably affixed to the housing. A resilient dust cap 92 is circumposed on the collar and overlies the resilient member 38, when the flange 60 is seated on the resilient member, as seen in Figure 4.

A supporting plate 94 is transversely fixed between the arms 28 and 30, above the housing, and supports one end of a spring 96 which is secured to an ear 98 integral with the post and disposed below the ear 80.

In use, the boom is lowered to bring the bucket 22 into engagement with the material and the bucket is pivoted on the outer ends of the boom arms to scoop up a portion of the material. Thus, the bucket is lowered and filled in the conventional manner. The post 54 is, meanwhile, swung rearwardly, about the pivot 86, by the actuating member 78, which is operated by the handle 82. The boom is lowered and the post 54 is moved forwardly by the actuating member 78, until the saddles 74 and 76 are in vertical alignment with the outer ends of the tubes 64 and 66. The boom is then lowered, until the saddle plates rest on the outer ends of the tubular members, the post being in substantially perpendicular relation to the housing. The weight of the boom and the loaded bucket is thus borne entirely by the resilient member 38 and, the pressure chamber being filled with liquid, the resilient member 38, which constitutes a diaphragm, is depressed inwardly to transmit a corresponding pressure on the liquid within the chamber. The quantity of liquid displaced by the pressure of the diaphragm 38 is conveyed by the tubular conduit 48 to the pressure indicator gauge 50. The pressure registered by the indicator gauge is proportionate to the load in the bucket, so that the amount of the load in the bucket is registered directly and accurately on the indicator dial.

When necessary, the operator may actuate the conventional hydraulic cylinder for opening the discharge door in the bottom of the bucket, to bleed off the desired amount of the load. In this manner, by actuating the slide or discharge door, the exact amount of material may be obtained, the desired amount being indicated by the pressure gauge 50.

While the weighing device has been illustrated and described in connection with a hydraulic loader, which is mounted on a tractor, it is obvious that the same may be utilized in other environments and with other types of loading devices.

Having thus described this invention, what is claimed is:

1. In combination with a loader including a vertically swingable bucket supporting boom, a weighing device comprising a hydraulic fluid containing chamber having an open upper end, means mounting said chamber on the loader, a diaphragm, means mounting the diaphragm on the open end of the chamber to close off said end, a member pivoted to the chamber and disposed substantially perpendicular above the diaphragm, an enlarged lower end on said member engageable on the diaphragm to depress the same and displace a portion of the fluid in the chamber, a conduit connected to the chamber for the passage of the displaced fluid therethrough, a pressure gauge connected to the conduit for indicating the amount of fluid displaced, and a bar member centrally pivoted to the upper end of the member for vertical movement about a horizontal axis, the outer ends of the bar member supporting the boom, whereby the weight of the boom and loaded bucket is imposed on the diaphragm to displace a proportionate amount of fluid from the chamber.

2. In combination with a loader including a vertically swingable bucket supporting boom, a weighing device comprising a hydraulic fluid containing chamber having an open upper end, means mounting said chamber on the loader, a diaphragm, means mounting the diaphragm on the open end of the chamber to close off said end, a member pivoted to the chamber and disposed substantially perpendicular above the diaphragm, an enlarged lower end on said member engageable on the diaphragm to depress the same and displace a portion of the fluid in the chamber, a conduit connected to the chamber for the passage of the displaced fluid therethrough, a pressure gauge connected to the conduit for indicating the amount of fluid displaced, and a bar member centrally pivoted to the upper end of the member for vertical movement about a horizontal axis, the outer ends of the bar member supporting the boom, whereby the weight of the boom and loaded bucket is imposed on the diaphragm to displace a proportionate amount of fluid from the chamber, said means mounting the diaphragm on the upper end of the chamber including a mounting ring superimposed on the diaphragm adjacent the periphery thereof and fasteners affixing said ring to the upper edges of the side walls of the housing.

3. In combination with a loader including a vertically swingable bucket supporting boom, a weighing device comprising a hydraulic fluid containing chamber having an open upper end, means mounting said chamber on the loader, a diaphragm, means mounting the diaphragm on the open end of the chamber to close off said end, a member pivoted to the chamber and disposed substantially perpendicular above the diaphragm, an enlarged lower end on said member engageable on the diaphragm to depress the same and displace a portion of the fluid in the chamber, a conduit connected to the chamber for the passage of the displaced fluid therethrough, a pressure gauge connected to the conduit for indicating the amount of fluid displaced, a bar member centrally pivoted to the upper end of the member for vertical movement about a horizontal axis, the outer ends of the bar member supporting the boom, whereby the weight of the boom and loaded bucket is imposed on the diaphragm to displace a proportionate amount of fluid from the chamber, and a resilient dust cup carried by the member and encompassing the lower end of the member and the diaphragm when the member is perpendicular to the diaphragm with the lower end bearing thereagainst.

4. In combination with a loader including a vertically swingable bucket supporting boom, a weighing device comprising a hydraulic fluid containing chamber having an open upper end, means mounting said chamber on the loader, a diaphragm, means mounting the diaphragm on the open end of the chamber to close off said end, a member pivoted to the chamber and disposed substantially perpendicular above the diaphragm, an enlarged lower end on said member engageable on the diaphrgam to depress the same and displace a portion of the fluid in the chamber, a conduit connected to the chamber for the passage of the displaced fluid therethrough, a pressure gauge connected to the conduit for indicating the amount of fluid displaced, a bar member centrally pivoted to the upper end of the member for vertical movement about a horizontal axis, the outer ends of the bar member supporting the boom, whereby the weight of the boom and loaded bucket is imposed on the diaphragm to displace a proportionate amount of fluid from the chamber, and remote control means for swinging said member vertically about a horizontal axis.

5. In a weighing device for loaders, the combination of a stationary structure including a loader frame and a hydraulic fluid chamber, a boom having up and down movement upon the frame, means mounted on the chamber to move downwardly relative thereto and arranged to transmit pressure to and to displace fluid contained within the chamber when so moved, a gauge associated with the chamber to indicate the quantity of fluid displaced, a member pivotally connected to said structure for adjustment between first and second positions, said member in its first position being interposed between the boom and said means so as to be engaged by the boom on downward movement of the boom and shifted downwardly with the boom, thus to move the pressure-transmitting means downwardly relative to the chamber and thereby displace fluid contained within the chamber, said member in its second position being disposed clear of the boom for downward movement of the boom without transmission of movement to the pressure transmitting means, a spring connected at opposite ends to said structure and member respectively and arranged to normally bias the member to its second position, and means connected to said member and controllable from a location remote from the member to shift the member to the first position thereof against the action of said spring.

6. In a weighing device for loaders, the combination of a stationary structure including a loader frame and a hydraulic fluid chamber, a boom having up and down movement upon the frame, means mounted on the chamber to move downwardly relative thereto and arranged to transmit pressure to fluid contained within the chamber when so moved, thus to displace said fluid, a gauge associated with the chamber to indicate the quantity of fluid displaced, a rigidly constituted, upstanding member pivotally connected to said structure for adjustment between first and second positions, said member in is first position being disposed in the path of downward movement of the boom and engaging the boom and said means at its upper and lower ends respectively so as to be shifted downwardly with the boom on downward movement of the boom, thus to move the pressure-transmitting means downwardly relative to the chamber and thereby displace fluid contained within the chamber, said member in its second position being disposed clear of the path of downward movement of the boom to allow said movement of the boom without transmission of movement to the pressure-transmitting means, a spring connected at opposite ends to said structure and member respectively and arranged to normally bias the member to its second position, and means connected to said member and controllable from a location remote from the member to shift the member to the first position thereof against the action of said spring.

7. In a weighing device for loaders, the combination of a stationary structure including a loader frame and a hydraulic fluid chamber, a boom pivotally connected at one end to the frame for vertical swinging movement, means mounted on the chamber to move downwardly relative thereto and arranged to transmit pressure to fluid contained within the chamber when so moved, thus to displace said fluid, a gauge associated with the chamber to indicate the quantity of fluid displaced, a rigidly constituted, upstanding member pivotally connected to said structure for adjustment between first and second positions, said member in its first position being disposed in the path of downward movement of the boom and engaging said means and an intermediate portion of the boom at its lower and upper ends respectively, so as to be shifted downwardly with the boom on downward movement of the boom, thus to move the pressure-transmitting means downwardly relative to the chamber and thereby displace fluid contained within the chamber, said member in its second position being disposed clear of the path of downward movement of the boom to allow said movement of the boom without transmission of movement to the pressure-transmitting means, a spring connected at opposite ends to said structure and member respectively and arranged to normally bias the member to its second position, and means connected to said member and controllable from a location remote from the member to shift the member to the first position thereof against the action of said spring.

8. In a weighing device for loaders, the combination of a stationary structure including a loader frame and a hydraulic fluid chamber, a boom having its intermediate portion overlying said chamber and pivotally connected at one end to the frame for vertical swinging movement, means mounted on the chamber to move downwardly relative thereto and arranged to transmit pressure to fluid contained within the chamber when so moved, thus to displace said fluid, a gauge associated with the chamber to indicate the quantity of fluid displaced, a rigidly constituted, upstanding post extending between the boom and said pressure transmitting means and pivotally connected to said structure for adjustment between first and second positions, a load-equalizing member pivoted at its center to the upper end of the post, said member in the first position of the post being disposed in the path of downward movement of the boom and being engageable at its opposite ends by said boom so as to shift the post downwardly, the post engaging the pressure-transmitting means at its lower end to move said means downwardly relative to the chamber and thereby displace fluid contained within the chamber, said member in the second position of the post being disposed clear of the path of downward movement of the boom to allow said movement of the boom without transmission of movement to the pressure-transmitting means, a spring connected at opposite ends to said structure and post respectively and arranged to normally bias the post to its second position, and means connected to the post and controllable from a location remote from the post to shift the post to the first position thereof against the action of said spring.

9. In a weighing device for loaders, the combination of a stationary structure including a loader frame and a hydraulic fluid chamber, a boom having its intermediate portion overlying said chamber and comprising a pair of elongated, spaced arms pivotally connected at one end to the frame for vertical swinging movement, saddles secured rigidly to and extending laterally from the respective arms, means mounted on the chamber to move downwardly relative thereto and arranged to transmit pressure to fluid contained within the chamber when so moved, thus to displace said fluid, a gauge associated with the chamber to indicate the quantity of fluid displaced, a rigidly constituted, upstanding post extending between the boom and said pressure-transmitting means and pivotally connected to to said structure for adjustment between first and second positions, a load-equalizing member pivoted at its center to the upper end of the post and extending transversely of said arms, said member in the first position of the post being disposed in the path of downward movement of the boom and being engaged at its opposite ends by said saddles so as to shift the post downwardly, the post engaging the pressure-transmitting means at its lower end to move said means downwardly relative to the chamber and thereby displace fluid contained within the chamber, said member in the second position of the post being disposed clear of the saddles on downward movement of the boom to allow said movement of the boom without transmission of movement to the pressure-transmitting means, a spring connected at opposite ends to said structure and post respectively and arranged to normally bias the post to its second position, and means connected to the post and controllable from a location remote from the post to shift the post to the first position thereof against the action of said spring.

GEORGE C. REID.
ROBERT B. CHAMBERS.

References Cited in the file of this patent
UNITED STATES PATENTS

| Number | Name | Date |
|---|---|---|
| 454,249 | Bache | June 16, 1891 |
| 2,349,228 | Wolff | May 16, 1944 |
| 2,520,033 | Fuelling | Aug. 22, 1950 |
| 2,551,178 | Southerland | May 1, 1951 |